(12) United States Patent
Kuroda

(10) Patent No.: US 6,390,627 B1
(45) Date of Patent: May 21, 2002

(54) PROJECTION DISPLAY DEVICE

(75) Inventor: Akitoshi Kuroda, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/347,526

(22) Filed: Jul. 6, 1999

(30) Foreign Application Priority Data

Jul. 7, 1998 (JP) .......................................... 10-192141

(51) Int. Cl.[7] ........................ G03B 21/14; G03B 21/00; A47F 5/12
(52) U.S. Cl. ..................... 353/119; 353/70; 248/133
(58) Field of Search ........................ 353/69, 70, 119, 353/122; 248/649, 650, 652, 133, 140

(56) References Cited

U.S. PATENT DOCUMENTS

| | | | | |
|---|---|---|---|---|
| 1,854,832 A | * | 4/1932 | Gastonguay et al. | 248/651 |
| 2,431,669 A | * | 11/1947 | Nemeth | 248/413 |
| 2,696,961 A | * | 12/1954 | Fox | 248/650 |
| 3,016,793 A | * | 1/1962 | Armbruster | 353/101 |
| 3,155,362 A | * | 11/1964 | McCall | 248/688 |
| 3,968,949 A | * | 7/1976 | Romano, Jr. | 248/650 |
| 4,040,585 A | * | 8/1977 | Socas | 248/676 |
| 4,141,523 A | | 2/1979 | Brendgens | 248/653 |
| RE30,104 E | * | 10/1979 | Burnham | 14/71.3 |
| 5,037,047 A | * | 8/1991 | Chanko | 248/140 |
| 5,102,082 A | * | 4/1992 | Bang | 248/183.2 |
| 5,895,022 A | * | 4/1999 | Kim | 248/398 |
| 6,019,524 A | * | 2/2000 | Arbuckle | 396/427 |
| 6,171,408 B1 | * | 1/2001 | Gombrich | 108/90 |

FOREIGN PATENT DOCUMENTS

| | | |
|---|---|---|
| JP | 62-290292 | 12/1987 |
| JP | 09-054370 | 2/1997 |

* cited by examiner

Primary Examiner—Russell Adams
Assistant Examiner—Rodney Fuller
(74) Attorney, Agent, or Firm—Oliff & Berridge, PLC

(57) ABSTRACT

A projection display device is provided that is capable of having a small size and may be thin. The device consists of an outer case which opposes a set-up surface and a projection angle adjusting mechanism for adjusting a projection angle by changing the angle of the outer case with regard to the set-up surface. Since the projection angle adjusting mechanism is independently mounted on an opposing surface of the lower case opposing the set-up surface, a space for accommodating the projection angle adjusting mechanism within the device can be omitted.

7 Claims, 12 Drawing Sheets

PROJECTION DISPLAY DEVICE

BACKGROUND OF THE INVENTION

1. Field of Invention

The present invention relates to a projection display device and more particularly to a projection display device having a projection angle adjusting mechanism disposed in a housing case.

2. Description of Related Art

Hitherto, projection display devices are known which magnify and project optical images onto a projection screen, the images being formed by optically processing a beam from a light source corresponding to image information. These projection display devices are widely used for multimedia presentations on such occasions as meetings, academic meetings, and expositions, and may be provided in a meeting room for a presentation and the like.

The projection display device is placed on a set-up surface with the projecting lenses of the device directed toward a screen and the like. In order to adjust a projection angle with respect to the set-up surface, a projection angle adjusting mechanism is provided at the projection lens side end of the lower portion of the device.

Among conventional projection angle adjusting mechanisms, there are screw types and rack types. The former may consist of a nut member which is exposed at the bottom end, the portion from the center to the upper end of the bottom end being accommodated within the device, and a bolt member which is screwed into the bottom end of the nut member and which abuts the set-up surface at the bottom end as well. The latter may consist of a vertically movable rack member displaceably accommodated within the device with a leg portion disposed at the bottom end of the rack member to abut the set-up surface and a fixing member for fixing the rack member at a predetermined elevation.

In the screw type projection angle adjusting mechanism described above, since the nut member is accommodated within the device in a vertically extending state, a space for accommodating the projection angle adjusting mechanism in the device is required. The bolt member is required to have a large diameter to support the weight of the entire device, and a long length so as to be adjustable over a large angle range. Therefore, the nut member into which the bolt member is screwed is large, corresponding to the size of the bolt member, resulting in the need for a large space for the projection angle adjusting mechanism within the device. This inevitably causes the device to be large in size and thick.

In the rack type adjusting mechanism, since the rack member is vertically displaceably accommodated within the device, and since the fixing member for fixing the rack member is also accommodated within the device, a space within the device for disposing the projection angle adjusting mechanism is required. In particular, the rack member, similarly to the bolt member, is required to have a large thickness to support the weight of the entire device and a long length so as to be adjustable over a large angle range. This inevitably causes the device to be large in size and thick.

SUMMARY OF THE INVENTION

It is an object of the present invention to provide a projection display device capable of having a small size and which may be thin.

Accordingly, the present invention has been made to accomplish the above-mentioned object by independently disposing a projection angle adjusting mechanism conventionally accommodated within the device on an outer surface of an outer case, the projection angle adjusting mechanism. More specifically, according to the present invention, a projection display device placed on a set-up surface for projecting images formed by an optical system onto a projection screen may consist of an outer case with at least one surface opposing the set-up surface and a projection angle adjusting mechanism disposed on the outer case that adjusts a projection angle by changing an angle of the outer case with regard to the set-up surface. The projection angle adjusting mechanism is independently mounted on a surface of the outer case opposing the set-up surface.

According to the present invention, when the projection display device is placed on a set-up surface such as a desk surface, the projection angle adjusting mechanism disposed on a surface of the outer case opposing the set-up surface, that is, the bottom surface of the outer case, is maintained at a predetermined straddling angle.

According to the present invention, since the projection angle adjusting mechanism is disposed on the opposing surface of the outer case, a space for accommodating the projection angle adjusting mechanism within the device can be omitted. Therefore, reduction in projection display device space can be obtained, resulting in a device that may be small in size and thin.

In a projection display device according to the present invention, the projection angle adjusting mechanism may be detachably attached to the surface of the outer case opposing the set-up surface. Since the projection angle adjusting mechanism is independently mounted on the outer case in this configuration, it can be detachably attached to the outer case after assembling the body of the projection display device including the outer case to facilitate part replacement.

The projection angle adjusting mechanism may preferably consist of a hinge member pivotable with respect to the opposing surface of the outer case, and a fixing device that fixes the hinge member at a predetermined straddling angle thereof with respect to the opposing surface. Since the projection angle adjusting mechanism may consist of a hinge member in this configuration, it can be easily accommodated on the opposing surface (the bottom surface) of the outer case.

The hinge member may further consist of a first plate member and a second plate member rotatably fixed to the first plate member, and the fixing device may preferably consist of a moving member which moves corresponding to an open-and-closing motion of the hinge member and a retaining member that retains the first plate member and the second plate member at a predetermined straddling angle by fixing the moving member at a predetermined position. In this configuration, the projection angle can be set as desired by causing the first plate member and the second plate member to straddle each other. Moreover, the projection angle can be easily and securely fixed by changing the fixed position of the retaining member relative to the moving member, which are disposed in these plate members.

A projection display device according to the present invention may also preferably consist of a lever mechanism retained by the retaining member and for releasing the retention. In this configuration, the retention for the moving member by the retaining member and the release can be easily performed using the lever mechanism.

The lever mechanism may preferably consist of a plurality of operating portions for the retention by the retaining member and for releasing the retention, the retention being performed by at least one of the operating portions. In this configuration, the retention and release operations can be easily performed by grasping at least one of the plurality of operating portions.

In the retaining member, a plurality of grooves may further be formed, while a plurality of grooves may also be formed in the moving member portion in contact with the grooves of the retaining member, a pitch of the grooves formed in any one of the retaining member and the moving member may preferably be a plurality of times as large as that of the other. In this configuration, when the direction of the grooves of the retaining member or of the moving member even slightly deviates, the retaining member and the moving member can be smoothly engaged with each other.

In a projection display device according to the present invention, the projection angle adjusting mechanism may be preferably formed such that an inclined angle is adjustable by rotation about an axis in a direction that projecting images are projected toward the projection screen. In this configuration, even when the projection display device is inclined with respect to the set-up surface, the projection display device can be maintained in a stable position by adjusting the inclination of the projection angle adjusting mechanism itself.

The projection angle adjusting mechanism may preferably consist of an elastically deformable plate member having two ends, the plate member being axially supported at the two ends by the outer case such that a supporting shaft axis is in a direction that projecting images are projected toward the projection screen. In this configuration, the inclination of the projection display device can be easily adjusted by forcible elastic deformation of the plate member.

BRIEF DESCRIPTION OF THE DRAWINGS

FIG. 7(A) is a longitudinal sectional view showing the entire projection angle adjusting mechanism, while

DETAILED DESCRIPTION OF PREFERRED EMBODIMENTS

The present invention will be further illustrated with an embodiment with reference to the drawings.

(1) Overall Configuration of the Device

Figure 1:
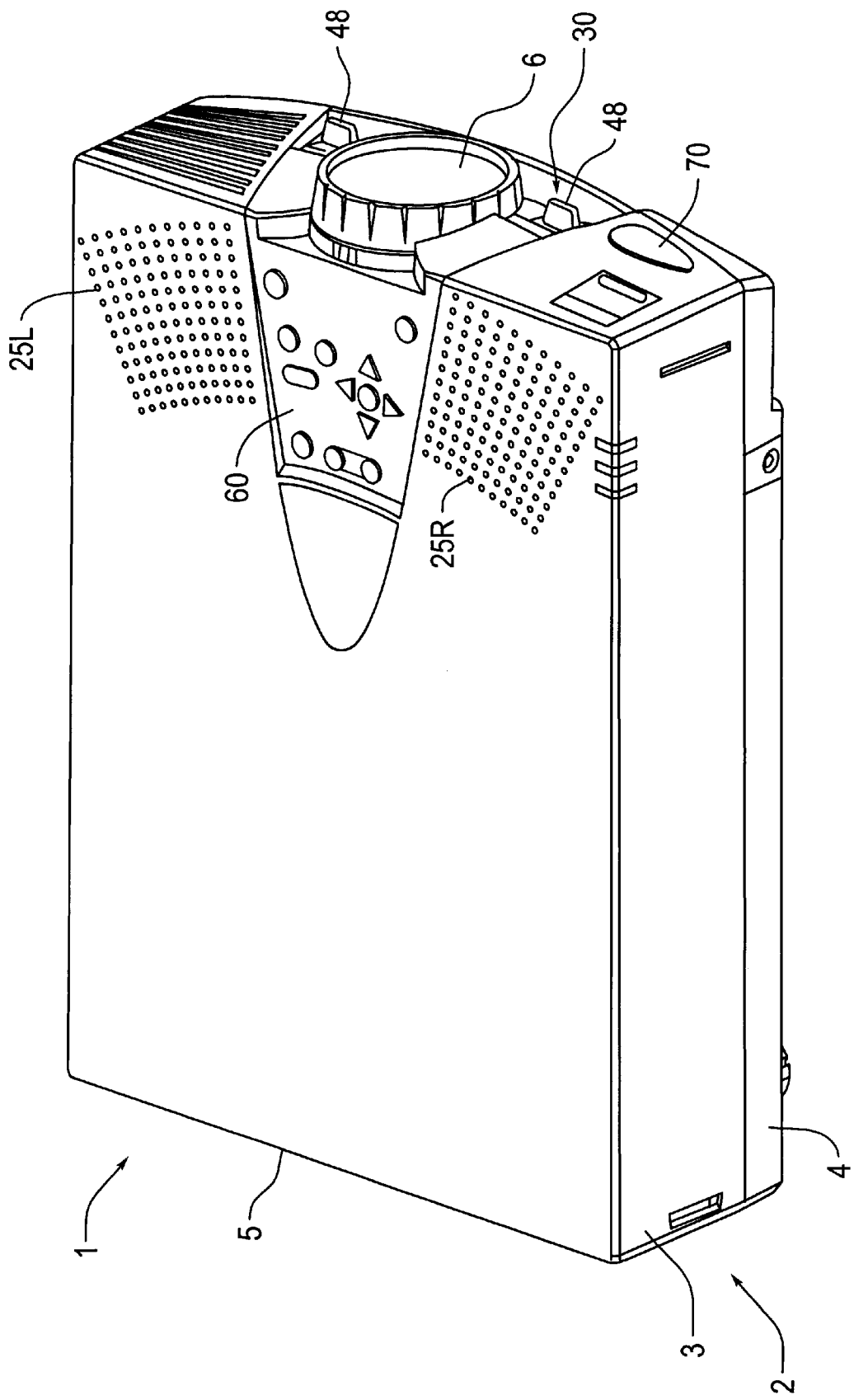
FIG. 1 is an external perspective view of a projection display device according to an embodiment of the present invention, viewed from the top.
Figure 2:
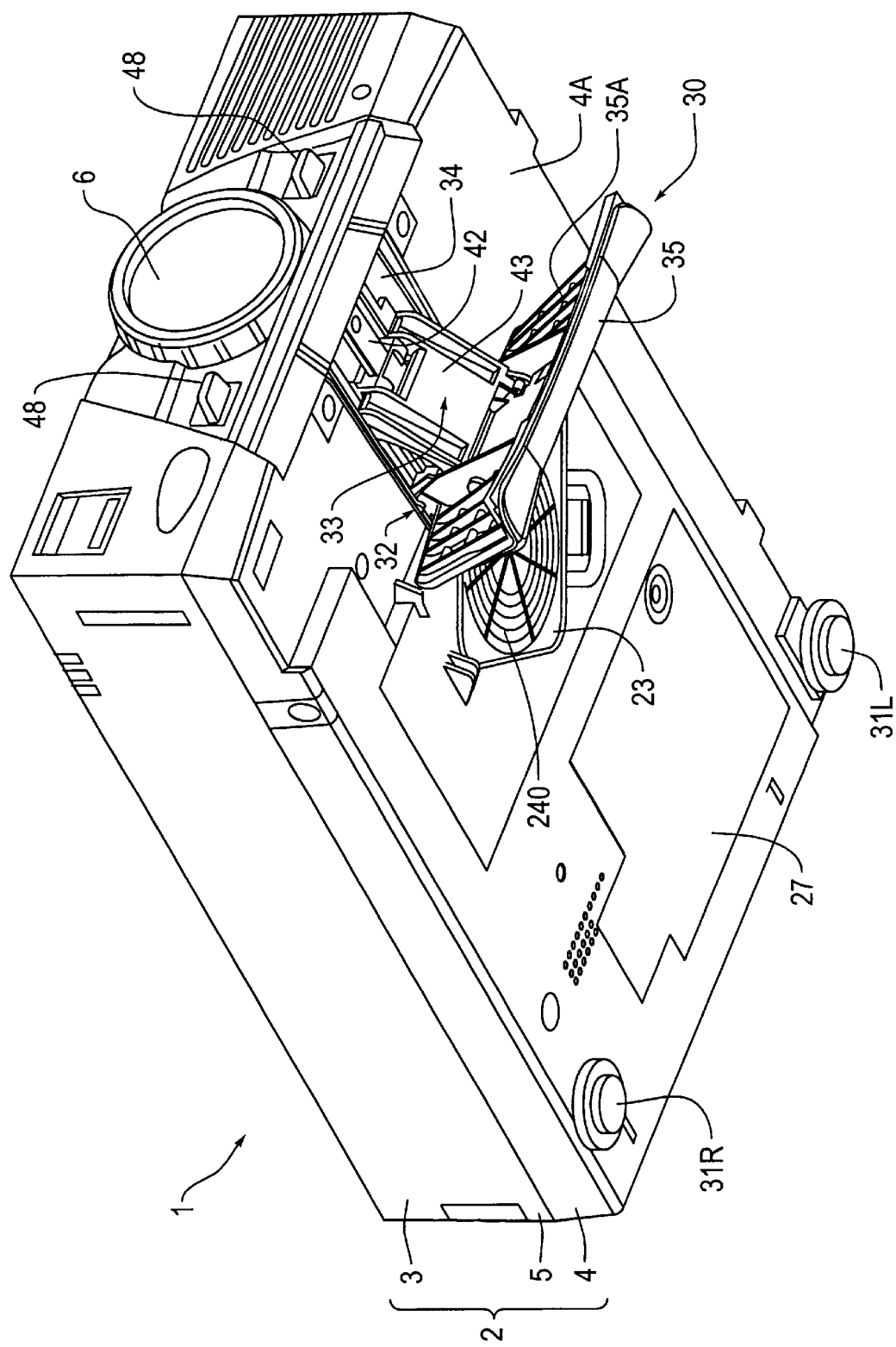
FIG. 2 is an external perspective view of a projection display device according to the embodiment, viewed from the bottom.

FIGS. 1 and 2 are schematic perspective views illustrating a projection display device 1 according to an embodiment of the present invention, while FIG. 1 is a perspective view viewed from the top and FIG. 2 is a perspective view viewed from the bottom.

The projection display device 1 is of a type in which a beam from a light source is separated into three primary colors, red "R", green "G", and blue "B" which in turn are each modulated corresponding to image information via a liquid crystal light valve (modulation system), and the modulated beams for each color after modulation are mixed through a prism (mixing system) to be magnified through projection lenses 6 and be displayed on a projection screen. All components except for a part of the projection lenses 6 are accommodated within a cover case 2.

(2) Cover Case Structure

The cover case 2 may be formed of an upper case 3 covering the top portion of the device, a lower case 4 forming the bottom portion of the device, and a rear case 5 covering the rear portion, while the bottom surface of the lower case 4 forms an opposing surface 4A opposing a set-up surface (not shown).

On the front top surface of the upper case 3, as shown in FIG. 1, a number of through-holes 25R and 25L are formed at the right and left ends, respectively. Between the through-holes 25R and 25L, operating switches 60 for adjusting image quality, etc., of the projection display device 1 is disposed. Moreover, on the front surface of the upper case 3, a receiving portion 70 for receiving a light signal from a remote control device (not shown) is disposed at the lower left portion viewed from the foreground.

On the bottom surface of the lower case 4, as shown in FIG. 2, a lamp replacement cover 27 for replacement of a lamp unit of a light source (described later), and an air filter cover 23, on which an air-intake 240 for cooling the interior of the device is formed, are disposed.

On the rear case 5, an AC inlet for receiving the outer power supply (not shown) and various input and output terminals group (not shown) are disposed, and an exhaust outlet 160 for exhausting air within the device (shown in FIG. 11) is formed adjacent to the input and output terminals group.

On the opposing surface 4A, that is, the bottom surface, of the lower case 4, as shown in FIG. 2, a projection angle adjusting mechanism 30 is independently disposed at approximately the center portion of the front end thereof, and feet 31R and 31L are provided at the right and left corner portions of the rear end thereof, respectively. The feet 31R and 31L are formed so as to move back and forth by rotation thereof, so as to change the inclination of the bottom surface by adjusting the displacement thereof.

(3) Structure of Projection Angle Adjusting Mechanism

Referring to FIGS. 3 to 8, the detailed configuration of the projection angle adjusting mechanism 30 will be described.

Figure 3:
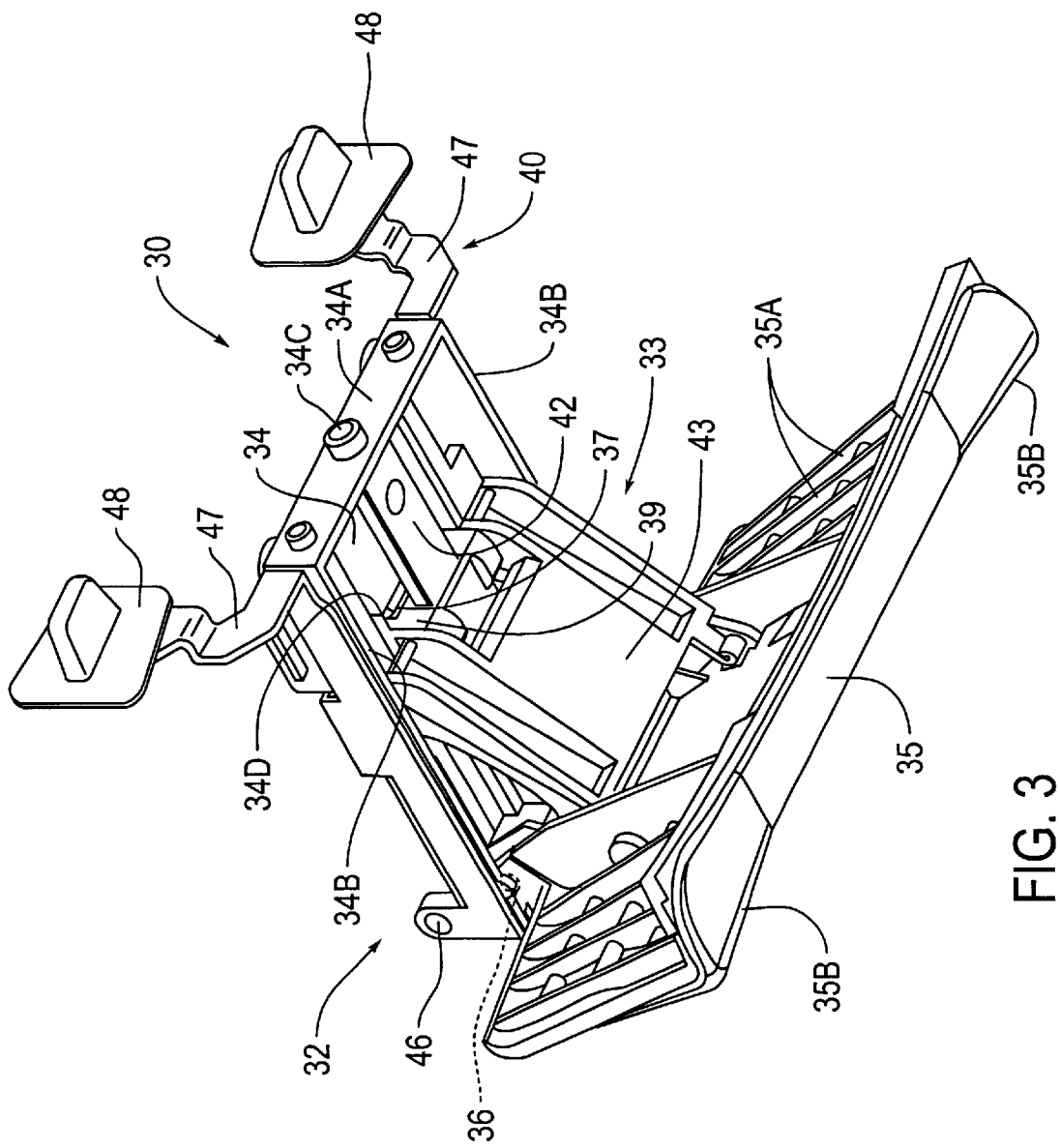
FIG. 3 is a perspective view showing the entire projection angle adjusting mechanism.
Figure 4:
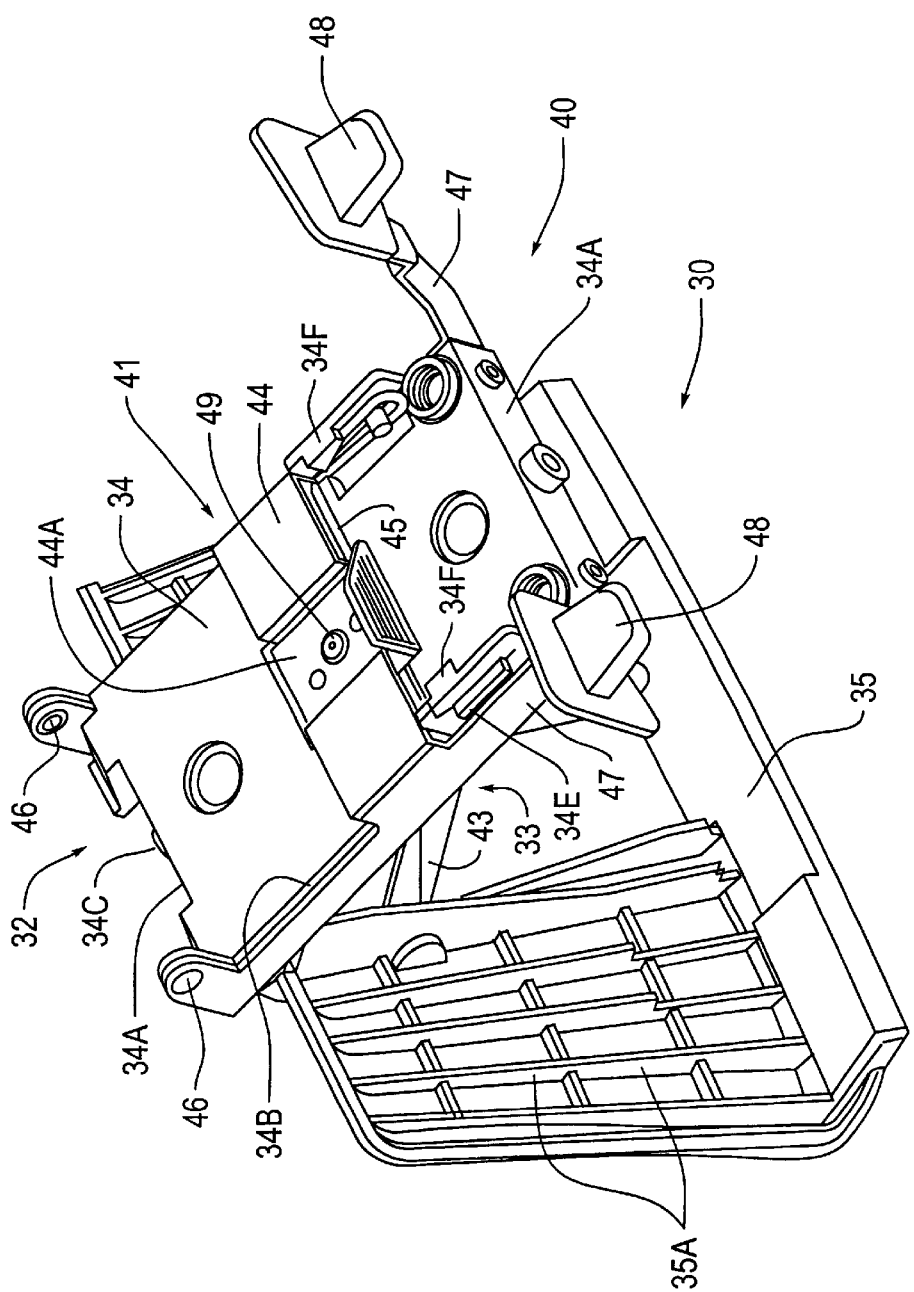
FIG. 4 is a perspective view showing the entire projection angle adjusting mechanism, viewed from a different direction from that of FIG. 3.
Figure 5:
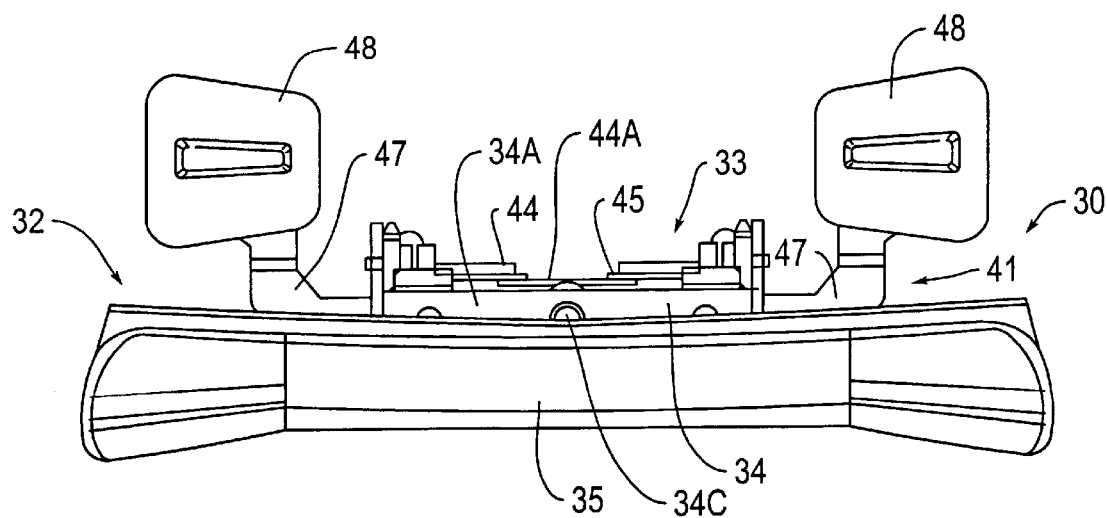
FIG. 5 is a front view showing the entire projection angle adjusting mechanism.
Figure 6:
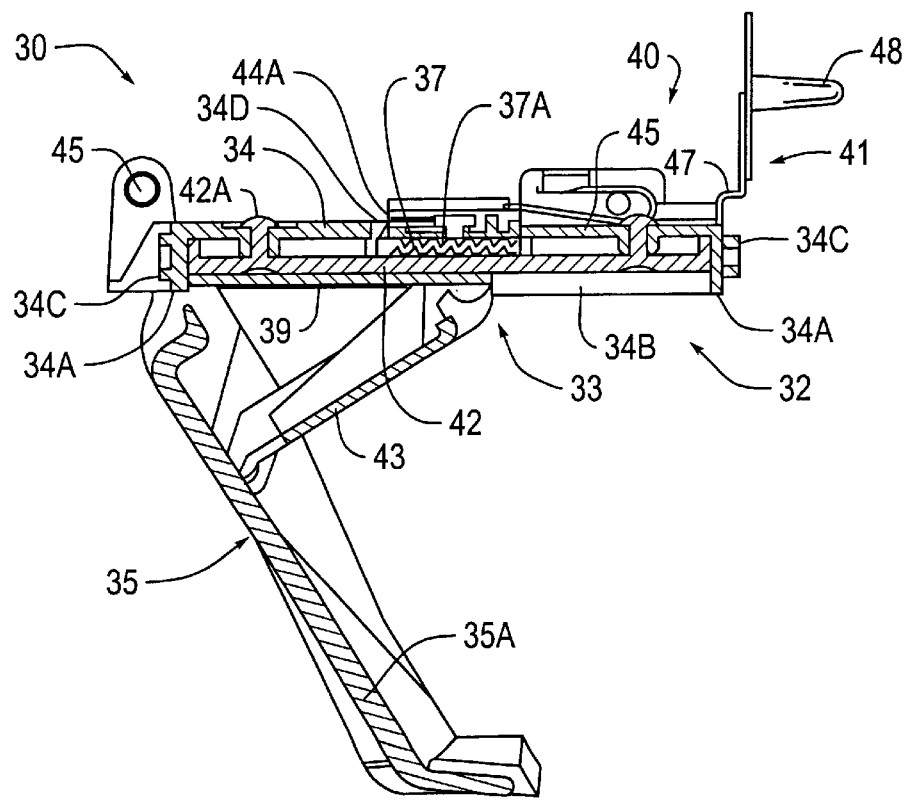
FIG. 6 is a longitudinal sectional view showing the entire projection angle adjusting mechanism.
Figure 7A:
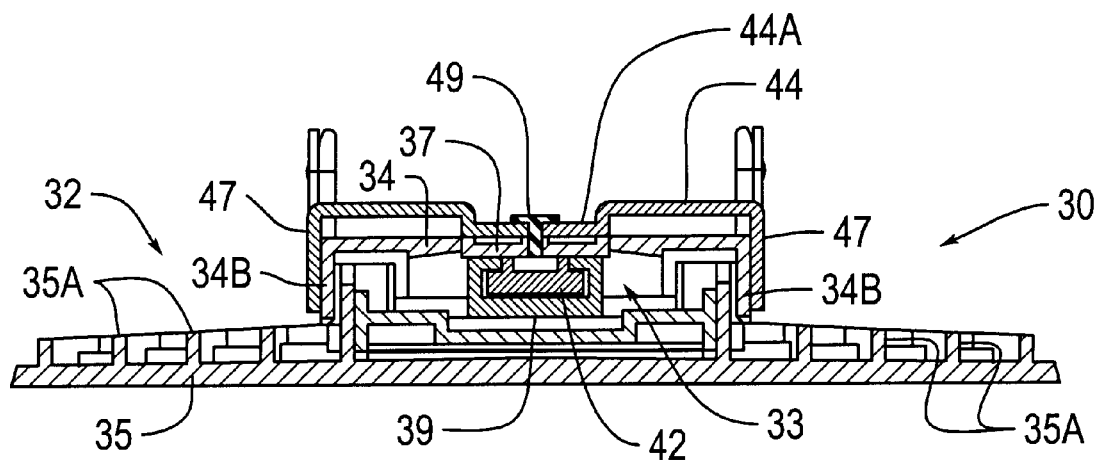
Figure 7B:
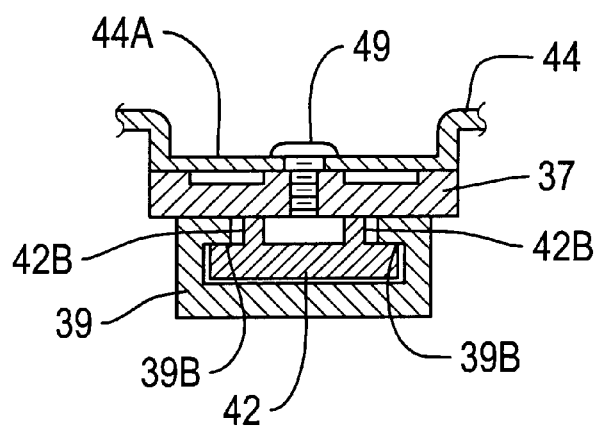
FIG. 7(B) is a longitudinal sectional view showing a part of the projection angle adjusting mechanism.
Figure 8:
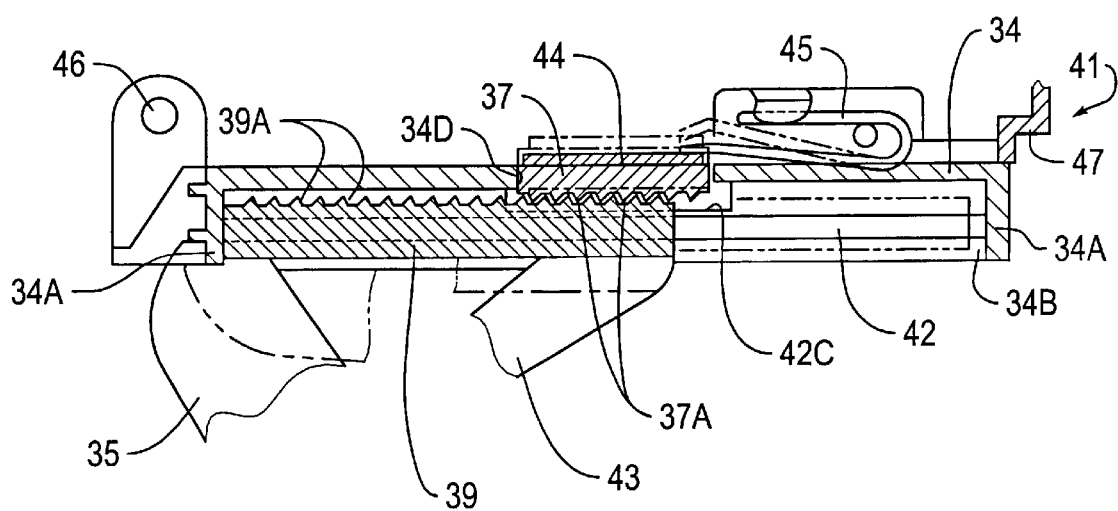
FIG. 8 is a longitudinal sectional view showing a part of the projection angle adjusting mechanism.

FIGS. 3 and 4 are perspective views of the projection angle adjusting mechanism viewed from different directions, respectively; FIG. 5 is a front view of the projection angle adjusting mechanism; FIG. 6 is a longitudinal sectional view of the projection angle adjusting mechanism; FIG. 7(A) is a longitudinal sectional view of the projection angle adjusting mechanism; FIG. 7(B) is a longitudinal sectional view illustrating the portion of the projection angle adjusting mechanism; and FIG. 8 is a longitudinal sectional view of a part of the projection angle adjusting mechanism.

The projection angle adjusting mechanism 30 is for use in adjusting a projection angle by changing the angle of the lower case 4 with respect to the set-up surface. The projection angle adjusting mechanism 30 is formed of a hinge member 32 pivotable with respect to the opposing surface 4A of the lower case 4 opposing the set-up surface and a fixing device 33 for fixing the hinge member 32 at a predetermined straddling angle thereof with respect to the opposing surface.

The hinge member 32 may consist of a first plate member 34 which is planar and rectangular, a second plate member 35 disposed in the underside of the first plate member 34, the bottom surface thereof being capable of abutting the set-up surface, and a hinge 36 pivotably mating the first plate member 34 with the second plate member 35.

The first plate member 34 is formed of an elastically deformable material such as a plastic having two frame portions 34A and two frame portions 34B at four edges thereof, respectively. Across the center of the two frame portions 34A opposing each other, an engaging portion 34C is formed.

The first plate member 34 is installed on the opposing surface 4A of the lower case 4 by engaging the engaging portion 34C with an engaging portion (not shown) of the lower case 4. The projection angle adjusting mechanism 30 is adjustable by rotation about the axis in the direction that projecting images are projected toward the projection screen owing to the axial support by the opposing surface 4A. The first plate member 34 is detachable from the lower case 4.

The second plate member 35 is formed in a curved shape at the end thereof and is supported on the set-up surface by both ends 35B of the curved portion. Reinforcing ribs 35A are formed in a latticed shape on the surface of the second plate member 35 opposing the first plate member 34.

The fixing device 33 may consist of a retaining member 37 capable of egress and ingress into and out of an opening portion 34D formed at the center portion of the first plate member 34, a sliding member 39 disposed in the second plate member 35 as a moving member sliding corresponding to the opening and closing motion of the second plate member 35 with regard to the first plate member 34, a guiding member 42 for guiding the sliding motion of the sliding member 39, an engaging piece 43 for engaging the first plate member 34 with the second plate member 35 through the sliding member 39, and a lever mechanism 40 for retaining by the retaining member 37 and for releasing the retention.

The retaining member 37 is approximately shaped as a plate having a plurality of grooves 37A (shown in FIG. 8) formed almost in parallel with the frame portion 34A of the first plate member 34. The sliding member 39, as shown in FIG. 7(A), is formed in a shape covering the longitudinal guiding member 42 which is disposed in the center portion between the frame portions 34A opposing each other of the first plate member 34. On the surface of the sliding member 39 being contact with the retaining member 37, a plurality of grooves 39A (shown in FIG. 8) for engaging with the plurality of grooves of the retaining member 37 are formed. By engaging these grooves 37A of the retaining member 37 with grooves 39A of the sliding member 39, the device can be fixed at a desired projecting angle.

The guiding member 42, as shown in FIG. 6, is a longitudinal hollow member and is fixed to the surface of the first plate member 34 by two fixing portions 42A formed inside the guiding member. As shown in FIG. 7(B), on the outer side-surfaces of the guiding member 42, grooves 42B for engaging with lugs 39B of the sliding member 39 are formed. Therefore, the movement of the sliding member 39 is guided by the grooves 42B. In the portion of the guiding member 42 overlapping with the retaining member 37, as shown in FIG. 8, a notch 42C is formed so that the guiding member 42 does not interfere with the retaining member 37.

As shown in FIG. 3, the engaging piece 43 is rotatably engaged with both the sliding member 39 and the second plate member 35. Accordingly, when the second plate member 35 is opened or closed with respect to the first plate member 34 about the hinge 36, the sliding member 39 reciprocates along the guiding member 42 corresponding to the opening or closing motion through the engaging piece 43.

As shown in FIG. 4, the lever mechanism 40 may consist of knob portions 48 as operating portions for retaining by the retaining member 37 and for releasing the retention as described above, a lever body 41 for retaining by the retaining member 37 and for releasing the retention corresponding to the operation of the knob portions 48, and a spring 45 for urging the retaining member 37 toward the sliding member 39 in a retained state by the retaining member 37.

The lever body 41 may consist of a left-right pair of arm portions 47 disposed adjacent to the frame portions 34B of the first plate member 34, and a connecting portion 44 for connecting the pair of arm portions 47 therebetween. In the center of the connecting portion 44, a recess portion 44A is formed. As shown in FIG. 7(A), the retaining member 37 is fixed to the bottom surface of the recess portion 44A by a screw 49. One end of each of the pair of arm portions 47 of the lever body 41 is connected to each of the left-right pair of knob portions 48, respectively. The other ends opposite to the knob portions 48 are supported slightly rotatably with regard to the frame portions 34B of the first plate member 34. The rotation of the arm portions 47 with regard to the frame portions 34B is limited by protruding portions 34E disposed in the frame portions 34B.

The spring 45 is a wire spring supported at both ends thereof by each of supporting portions 34F disposed in the left part and the right part of the frame portions 34B, respectively. The spring 45 urges the retaining member 37 fixed to the bottom surface of the recess portion 44A of the lever body 41, therethrough, by its spring force.

(4) Method for Adjusting a Projection Angle by the Projection Angle Adjusting Mechanism Procedures will be described for adjustment of a projection angle by the projection angle adjusting mechanism 30 described above.

As may be understood from FIG. 4, when a user raises the body of the projection display device by holding the knob portions 48, the raising operation will be transmitted to the connecting portion 44 of the lever body 41 through the pair of arm portions 47. As shown in FIG. 7(A), the retaining member 37 is fixed to the recess portion 44A of the connecting portion 44. Accordingly, when the body of the projection display device is raised by holding the knob portions 48, as shown by a imaginary line in FIG. 8, the retaining member 37 is raised against the urging force of the spring 45 so that the engagement between the retaining member 37 and the sliding member 39 is released.

When the device body is moved up and down in the released state of the engagement, that is, in the holding state of the knob portions 48, the sliding member 39 reciprocates along the guiding member 42 corresponding to the movement. Simultaneously, the second plate member 35 is opened and closed with regard to the first plate member 34 about the hinge 36. Therefore, in this state, a user can adjust a projection angle while observing projected images.

When the knob portions are freed at the position in which the desired projection angle is obtained, as shown by the solid line in FIG. 8, the retaining member 37 is brought into engagement with the sliding member 39 by the urging force of the spring 45 and the weight of the device body, so that the projection angle of the device is fixed.

The pitch of the grooves 39A formed on the sliding member 39 is set to be twice as large as the pitch of the grooves 37A formed on the retaining member 37. This is because the engagement can be easily effected even when the direction of the grooves 37A of the retaining member 37 deviates slightly from the direction of the grooves 39A of the sliding member 39. The pitch of the grooves 39A of the sliding member 39 is not limited to twice as large as the pitch of the grooves 37A of the retaining member 37 and may be 3 to 4 times as large. However, when the pitch is set too large, since the load exerted on each of a plurality of teeth formed between the grooves becomes too large, the strength of the teeth must be increased. Therefore, the pitch of the grooves 39A is preferably not too large.

(5) Internal Structure of the Device

Figure 9:
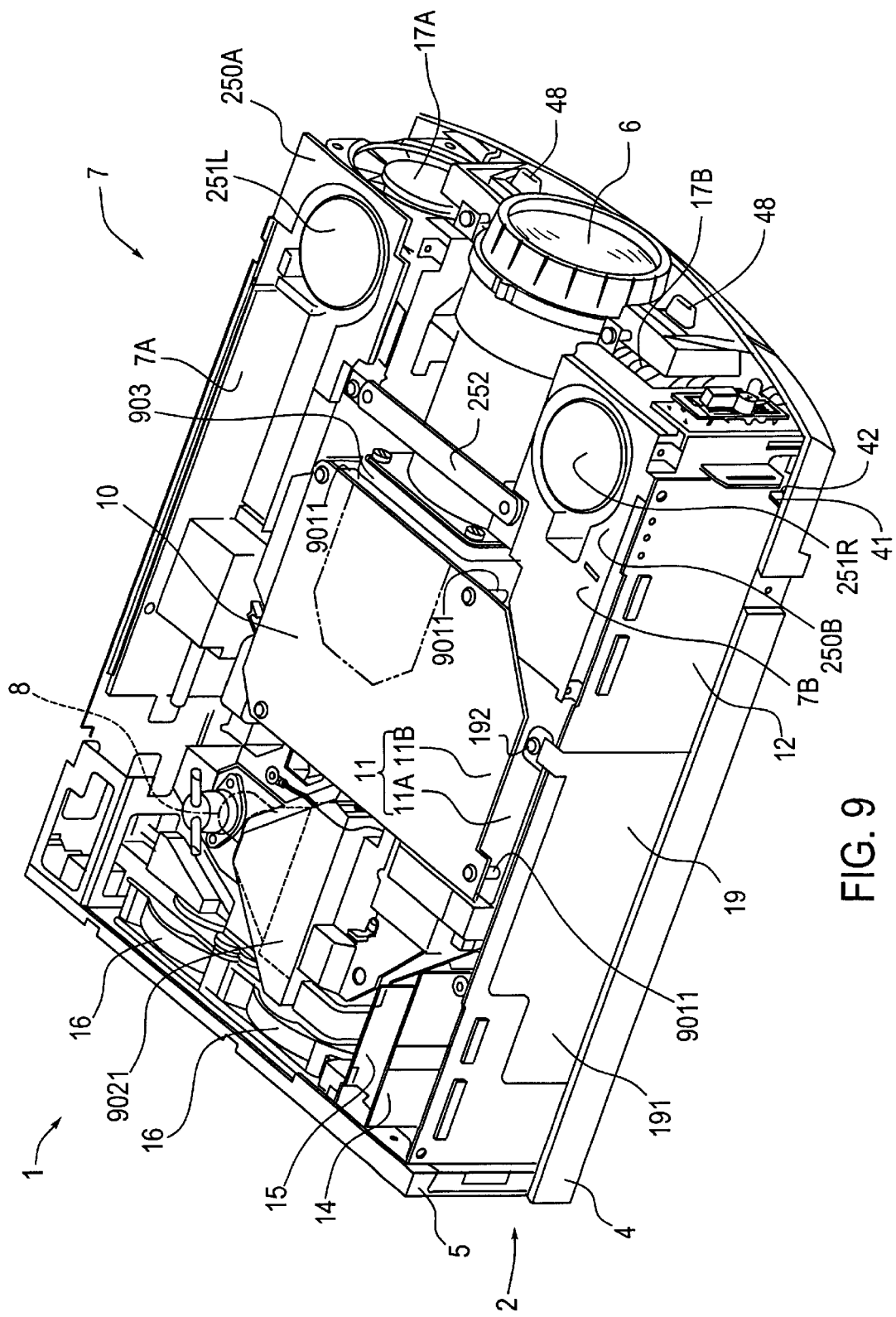
FIG. 9 is a perspective view of a projection display device according to the embodiment, showing the internal structure thereof.
Figure 10:
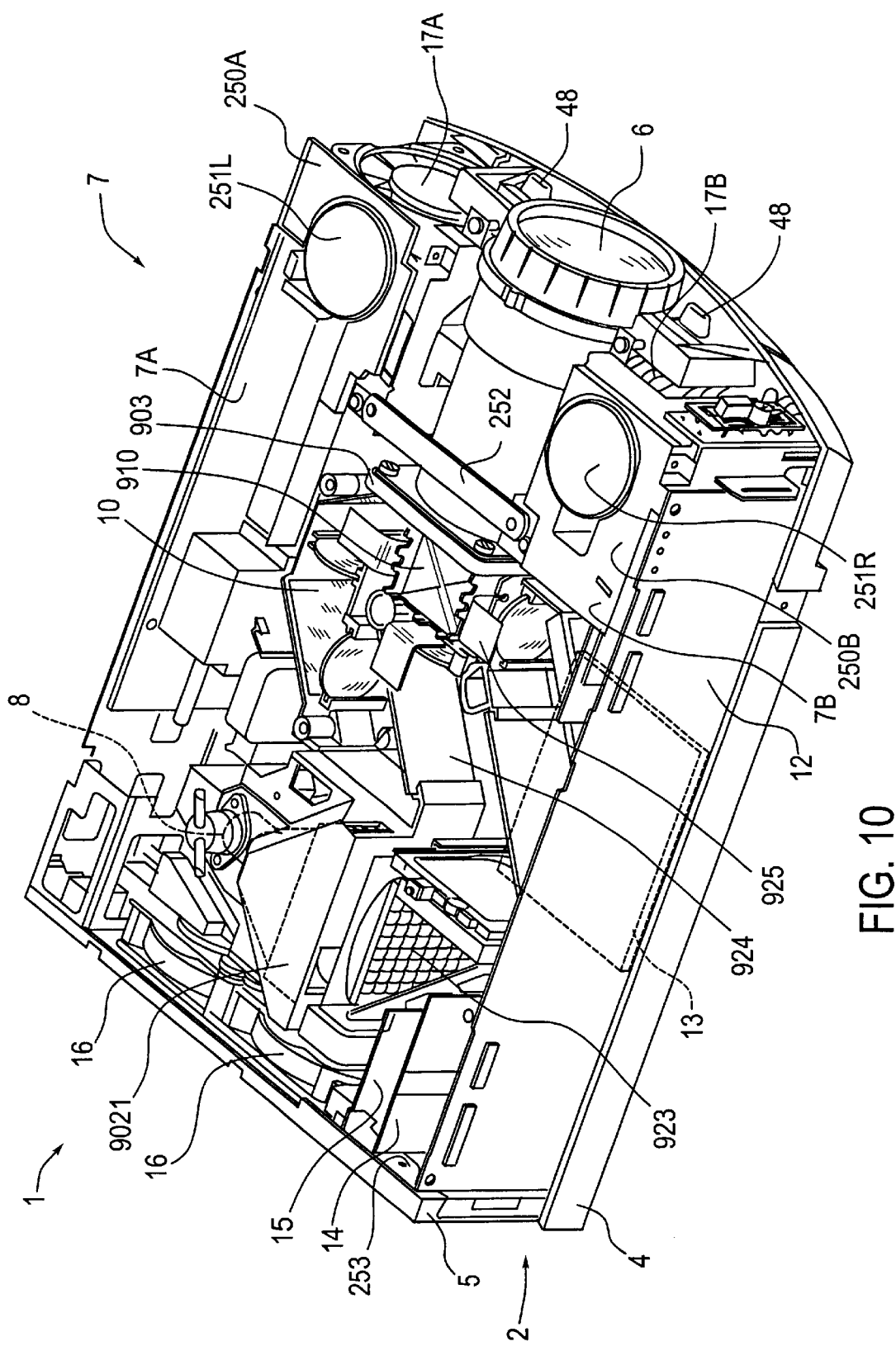
FIG. 10 is a perspective view of a projection display device according to the embodiment, showing the optical system inside thereof.
Figure 11:
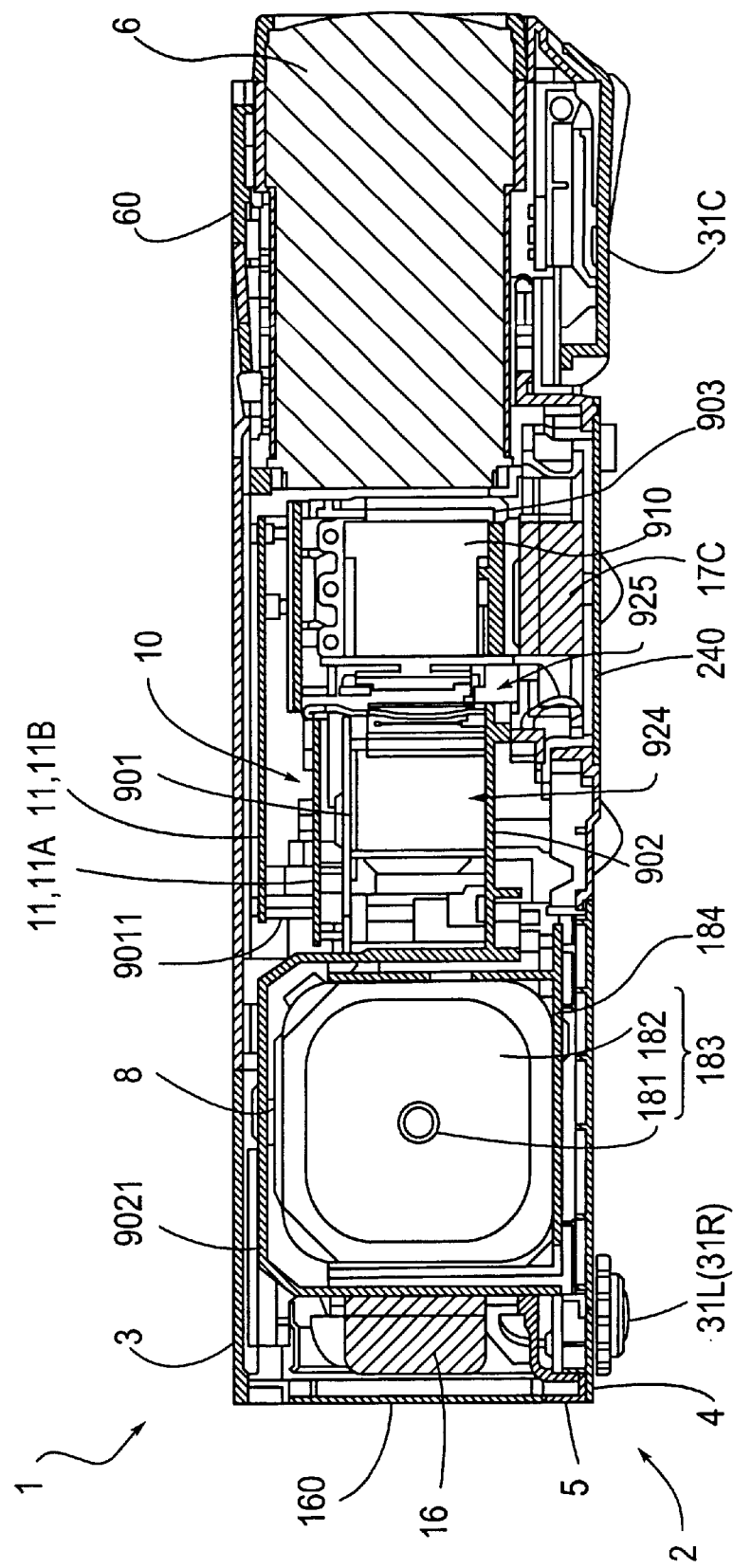
FIG. 11 is a vertical sectional view of a projection display device according to the embodiment, showing the internal structure thereof.

FIGS. 9 to 12 illustrate the internal structure of the projection display device 1. FIGS. 9 and 10 are internal schematic perspective views of the device, while FIG. 11 is a vertical cross-sectional view of the projection display device 1.

As shown in these drawings, in the interior of the cover case 2, a power supply unit 7 as an electrical source, a light source lamp unit 8, an optical unit 10 forming an optical system, an upper-and-lower pair of driver boards 11, a main board 12, and the like are disposed.

The power supply unit 7 may consist of first and second power supply blocks 7A and 7B disposed on the two sides of the projection lenses 6, respectively. The first power supply block 7A, having a transformer, a rectifying circuit, a smoothing circuit, a voltage stabilizing circuit, etc., transforms the electric power obtained from an AC inlet (not shown) to mainly supply it to the second power supply block 7B and the light source lamp unit 8. The second power supply block 7B, having a transformer and various circuits as does the first power supply block 7A, further transforms and supplies the electric power obtained from the first power supply block 7A. The electric power is supplied to a power supply circuit board 13 (shown by a dotted line in FIG. 10) disposed underneath the optical unit 10 and first and second drawing fans 17A and 17B disposed adjacent to the power supply blocks 7A and 7B. From the electric power of the second power supply block 7B, the power supply circuit on the power supply circuit board 13 supplies the main board 12, etc., with the electric power for driving a control circuit and for other low-power electric parts. The second drawing fan 17B is disposed between the second power supply block 7B and the projection lenses 6 such that cooling air is sucked to the inside from the outside through a clearance formed between the projection lenses 6 and the upper case 3 (shown in FIG. 1). The power supply blocks 7A and 7B have cover members 250A and 250B, respectively, which in turn have speakers 251R and 251L, respectively, disposed in the positions thereof corresponding to the through-holes 25R and 25L of the upper case 3.

The light source lamp unit 8, forming a light source portion of the projection display device 1, may consist of a light source device 183 including a light source lamp 181 and a reflector 182, and a lamp housing 184 for accommodating the light source device 183. The light source lamp unit 8 is covered by an accommodating portion 9021 integrally formed with a lower light guide 902 (shown in FIG. 11) so as to be replaceable from the above-mentioned lamp replacement cover 27. Behind the accommodating portion 9021, a right-and-left pair of exhaust fans 16 are disposed laterally in positions corresponding to exhaust air outlets (not shown) of the rear case 5, respectively. The cooling air drawn by the first, second and third drawing fans 17A, 17B and 17C is sucked to the inside thereof by these exhaust fans 16 through an opening formed adjacent to the accommodating portion 9021 to be removed from an exhaust air outlet 160 (shown in FIG. 11) after thereby cooling the light source lamp unit 8. In addition, the electric power for each exhaust fan 16 is supplied by the power supply circuit board 13.

The optical unit 10 is a unit for image processing of outgoing beams from the light source lamp unit 8 corresponding to image information, and may consist of an illuminating optical system 923, a color-separating optical system 924, a modulating system 925, and a prism unit 910 as a color-synthesizing optical system. Optical elements of the optical unit 10 other than the modulating system 925 and the prism unit 910 are held in an arrangement vertically sandwiched between upper and lower light guides 901 and 902. The upper light guide 901 and lower light guide 902 are integrally formed with each other and are fixed to the side of the lower case 4 by fixing screws. These upper light guide 901 and lower light guide 902 are also fixed to the side of the prism unit 910 by fixing screws.

The rectangular prism unit 910 is fixed by fixing screws to the back surface of a head body 903, a structure integrally molded of magnesium having generally L-shaped side surfaces. Liquid crystal light valves 925R, 925G, and 925B forming the modulating system 925 are disposed so as to oppose three side surfaces of the prism unit 910, respectively, and are also fixed to the head body 903 by fixing screws. In addition, the liquid crystal light valve 925B is arranged opposing the liquid crystal light valve 925R with the prism unit 910 therebetween (see FIG. 12). The liquid crystal light valves 925R, 925G, and 925B are cooled by cooling air from a third drawing fan 17C disposed in the bottom surface of the head body 903 corresponding to the above-mentioned air-intake 240. To the front surface of the head body 903, the projection lenses 6 are further fixed at the base end thereof by fixing screws. The head body 903 with the prism unit 910, the modulating system 925, and the projecting lenses 6 in this manner, as shown in FIG. 11, is fixed to the lower case 4 by fixing screws.

The pair of driver boards 11 is for controlling the above-mentioned liquid crystal light valves 925R, 925G, and 925B of the modulating system 925 and is disposed in the upper portion of the optical unit 10. A lower driver board 11A and an upper driver board 11B of the pair of driver boards 11 are separated from each other by stud bolts 9011, and a number of elements (not shown) forming control circuits are mounted on the opposing surfaces of the boards. That is, the number of elements are effectively cooled by the cooling air passing through between the driver boards 11. The cooling air comes through the opening of the upper light guide 901 after cooling the liquid crystal light valves 925R, 925G, and 925B to enter the clearance between the driver boards 11.

The main board 12 formed with a control circuit for controlling the entire projection display device 1 is disposed on the side of the optical unit 10. The main board 12 is electrically connected to the above-mentioned driver boards 11 and the operating switches 60, while being electrically connected to an interface board 14 having an input-or-output terminal group (not shown), a video board 15, and the power supply circuit board 13 through connectors, or the like. The control circuit of the main board 12 is driven by electric power produced by the power supply circuit of the power supply circuit board 13, that is, electric power from the second power supply block 7B. In addition, the main board 12 is cooled by cooling air coming therein from the second drawing fan 17B through the second power supply block 7B.

Referring to FIG. 9, between the main board 12 and the cover case 2 (in FIG. 9, only the lower case 4 and the rear case 5 are shown), a metal guard member 19 made of aluminum is disposed. The guard member 19, having a large surface portion extending across the upper and lower ends, is fixed to the cover member 250B of the second power supply block 7B at the upper portion by fixing screws 192, while being engaged and supported by a slit, for example, of the lower case 4 at the bottom end. This results in preventing the intervention between the upper case 3 (FIG. 1) and the main board 12 when the upper case 3 is placed to the lower case 4, and also results in protecting the main board 12 from ambient noise.

(6) Structure of the Optical System

Figure 12:
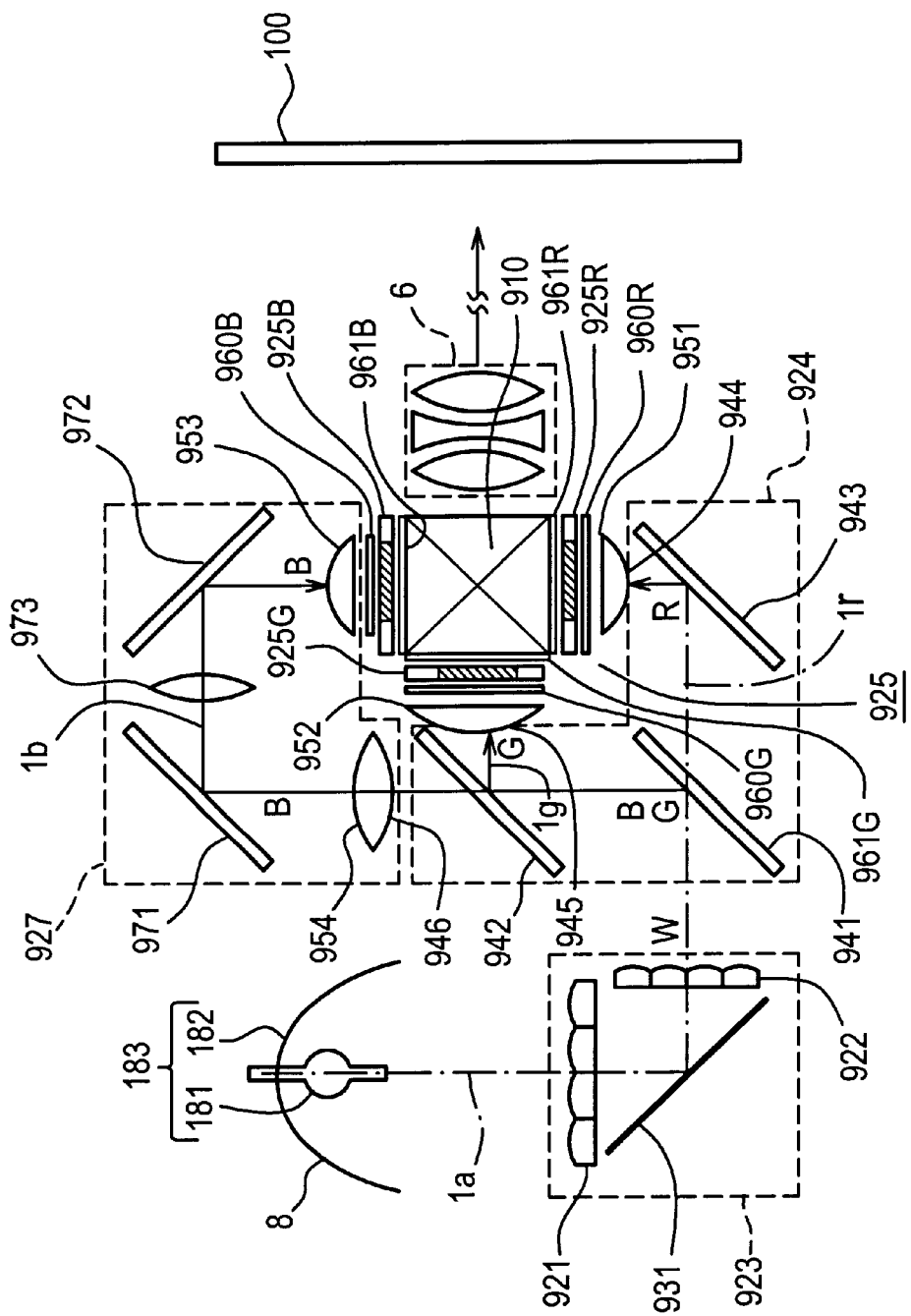
FIG. 12 is a schematic diagram for illustrating the structure of an optical system of the projection display device according to the embodiment.

The structure of the optical system of the projection display device 1, that is, the optical unit 10 will be described with reference to the schematic view shown in FIG. 12.

As described above, the optical unit 10 may consist of the illuminating optical system 923 which equalizes the luminance distribution on the surface of a beam "W" from the light source lamp unit 8, the color-separating optical system 924 which separates a beam "W" from the light source lamp unit 8 into red "R", green "G", and blue "B", the modulating system 925 which modulates colors "R", "G", and "B" of the beam "W" according to image information, and the prism unit 910 as the color-synthesizing optical system which synthesizes each color of the beam after modulation.

The illuminating optical system 923 may consist of a reflecting mirror 931 which bends the optical axis 1*a* of an outgoing beam "W" from the light source lamp unit 8 in the front direction of the device, and first and second lens plates 921 and 922 disposed so that the reflecting mirror 931 is sandwiched therebetween.

The first lens plate 921, having a plurality of rectangular lenses disposed in a matrix, separates an outgoing beam from the light source into a plurality of partial beams so as to converge each partial beam in the vicinity of the second lens plate 922.

The second lens plate 922 having a plurality of rectangular lenses disposed in a matrix, has a function to overlay each partial beam going out from the first lens plate 921 onto liquid crystal light valves 925R, 925G, and 925B (described later) forming the modulating system 925.

In this embodiment of the projection display device 1, surfaces of the liquid crystal light valves 925R, 925G, and 925B can be illuminated by light of generally equalized luminous intensity by means of the illuminating optical system 923 in this manner, so that projection images without nonuniform luminous intensity can be obtained.

The color-separating optical system 924 may consist of a blue light and green light reflecting dichroic mirror 941, a green light dichroic reflecting mirror 942, and a reflecting mirror 943. First, at the blue light and green light reflecting dichroic mirror 941, the green and blue beams "G" and "B" contained in the beam "W" outgoing from the illuminating optical system 923 are orthogonally reflected so as to proceed toward the green light reflecting dichroic mirror 942.

The red beam "R" passes through the blue light and green light reflecting dichroic mirror 941 and is orthogonally reflected by the reflecting mirror 943 disposed behind the dichroic mirror 941 to be incident toward the prism unit 910 from an outgoing portion 944 of the red beam "R". Among the blue and green beams "B", "G" reflected at the blue light and green light reflecting dichroic mirror 941, only the green beam "G" is orthogonally reflected by the green light reflecting dichroic mirror 942 to be incident toward the prism unit 910 from an outgoing portion 945 of the green beam "G". The blue beam "B" having passed the green light reflecting dichroic mirror 942 is incident toward a light-guide system 927 from an outgoing portion 946 of the blue beam "B". In this embodiment, all of the distances between the outgoing portion of the beam "W" of the illuminating optical system 923 and each of outgoing portions 944, 945, and 946 of the color beams "R", "G", and "B", respectively, in the color-separating optical system 924 are set to be the same.

On the outgoing sides of the outgoing portions 944 and 945 of the red and green beams "R" and "G" in the color-separating optical system 924, condenser lenses 951 and 952 are disposed, respectively. Therefore, the red and green beams "R" and "G" exiting from each outgoing portion are incident into the condenser lenses 951 and 952, respectively, into parallel rays.

The red and green beams "R" and "G" being parallel rays in this manner are incident in the liquid crystal light valves 925R and 925G through incidental side polarizing plates 960R and 960G so as to be modulated and to add image information corresponding to each color. That is, the liquid crystal light valves 925R and 925G are switching-controlled corresponding to image information by the above-mentioned driver boards 11; each color beam passing therethrough is thereby modulated. On the other hand, the blue beam "B" is guided to the liquid crystal light valve 925B through the light-guide system 927 to thereby be similarly modulated corresponding to image information. In addition, as for the liquid crystal light valves 925R, 925G, and 925B according to this embodiment, a polysilicon TFT, for example, may be used as a switching element.

The light-guide system 927 may consist of a condenser lens 954 disposed in the outgoing side of the outgoing portion 946 of the blue beam "B", an incidental side reflecting mirror 971, an outgoing side reflecting mirror 972, an intermediate lens 973 disposed between these mirrors, and a condenser lens 953 disposed in the foreground of the liquid crystal light valve 925B. The blue beam "B" exiting from the condenser lens 953 is incident onto the liquid crystal light valve 925B through an incidental side polarizing plate 960B to thereby be modulated. At this time, the optical axis 1*a* of the beam "W" is flushed with optical axes 1*r*, 1*g*, and 1*b* of the color beams "R", "G", and "B", respectively. Among optical paths of each color beam, that is, distances from a light source lamp 181 to each liquid crystal light valve, the blue beam is the largest, resulting in the largest loss in quantity of light of the beam. However, by placing the light-guide system 927 therebetween, the loss in quantity of light can be prevented.

The color beams "R", "G", and "B" modulated by the liquid crystal light valves 925R, 925G, and 925B by passing therethrough are incident onto the prism unit 910 via outgoing-side polarizing plates 961R, 961G, and 961B to be thereby synthesized. Color images synthesized by the prism unit 910 are magnified and projected through the projection lenses 6 onto a projection screen 100 placed at a predetermined position.

(7) Advantages of the Embodiment

The following advantages will be obtained in the embodiment.

(i) In the device consisting of an outer case 2 in which the bottom surface thereof opposes a set-up surface, and a projection angle adjusting mechanism 30 disposed in a lower case 4 of the outer case 2 for adjusting a projection angle by changing the angle of the lower case 4 with regard to the set-up surface, since the projection angle adjusting mechanism 30 is independently mounted on a surface 4A of the lower case 4 opposing the set-up surface, a space for accommodating the projection angle adjusting mechanism 30 within the device can be omitted. Therefore, reduction in projection display device space can be obtained, resulting in a device capable of having a small size and which may be thin.

Moreover, the projection angle adjusting mechanism 30 is independently mounted on the lower case 4, and it is detachably attached to the outer case 2 after assembling the body of the device including the outer case 2, projection lenses 6, the power supply unit 7, the light source lamp unit 8, the optical unit 10 forming the optical system, etc. Accordingly, when the projection angle adjusting mechanism 30 is broken, for example, the new projection angle adjusting mechanism 30 can be easily attached without disassembling the body portions.

(ii) The projection angle adjusting mechanism 30 may consist of a hinge member 32 being pivotable with respect to the opposing surface of the lower case 4 and a fixing device 33 for fixing the hinge member 32 at a predetermined straddling angle thereof with respect to the opposing surface. Therefore, the projection angle adjusting mechanism 30 can be easily accommodated in the opposing surface (bottom surface) of the outer case.

(iii) Since the hinge member 32 may consist of the first and the second plate members 34 and 35, and a hinge 36 rotatably engaging these plate members 34 and 35, a projection angle can be set as desired by causing the first and the second plate members 34 and 35 to open and close with respect to each other about the hinge 36. Moreover, the projection display device can be maintained in a stable position since it is formed so as to be supported by both ends 35B of the second plate member 35 in a set-up position.

(iv) The fixing device 33 may consist of a retaining member 37 disposed on the first plate member 34 and a sliding member (moving member) 39 which slides corresponding to the open-and-closing motion of the second plate member 35 disposed on the first plate member 34 with respect to the first plate member 34. The projection angle can be easily and securely fixed by changing the engaging state between the retaining member 37 and the sliding member 39.

(v) Since the grooves 37A of the retaining member 37 are formed with a constant pitch and the pitch of the grooves 39A of the sliding member 39 is formed a plurality of times as large as the pitch of the grooves 37A of the retaining member 37, the engagement between the retaining member 37 and the sliding member 39 can be easily brought even when the direction of the grooves 37A of the retaining member 37 or the direction of the grooves 39A of the sliding member 39 deviates slightly.

(vi) Since the projection angle adjusting mechanism 30 is adjustable by rotation about the axis in the direction that projecting images are projected toward the projection screen, even when the projection display device is placed at an incline with respect to the set-up surface, the device can be maintained in a stable position by adjusting the inclination of the projection angle adjusting mechanism 30 itself.

(vii) Since the projection angle adjusting mechanism 30 may consist of an elastically deformable first plate member 34 which is axially supported at both ends thereof by the lower case 4 such that the supporting shaft axis is in the direction that projecting images are projected toward the projection screen, the inclination of the projection display device can be easily adjusted by forcible elastic deformation of the first plate member 34.

(viii) Since the projection display device may consist of a lever mechanism 40 for retaining by the retaining member 37 and for releasing the retention, the retaining operation for the sliding member 39 by the retaining member 37 and the releasing operation can be easily performed using the lever mechanism 40.

Moreover, since the lever mechanism 40 may consist of a plurality of knob portions 48 (operating portions) for retaining by the retaining member 37 and for releasing the retention such that the above-mentioned operations can be performed by the knob portions 48, the retaining and releasing operations can be easily performed.

(ix) In the projection display device 1, since the power supply unit 7, which is a comparatively large part among the components, may consist of smaller first and second power supply blocks 7A and 7B spaced with respect to each other, useless areas can be substantially omitted inside the device 1 by an efficient layout of the first and second power supply blocks 7A and 7B, resulting in miniaturization of the device 1.

In contrast, conventionally, useless areas can be easily produced on the both sides of the projection lenses 6 because these spaces are too small to accommodate various components. In this embodiment, however, since the power supply unit 7 may consist of the first and second power supply blocks 7A and 7B, such small spaces can successfully accommodate the first and second power supply blocks 7A and 7B so as to improve layout efficiency, reliably resulting in miniaturization of the device.

Since the first and second power supply blocks 7A and 7B are disposed on both sides of the projection lenses 6, respectively, a heavy head body 903 can be placed generally in the center portion in the lateral direction so that the weight of the device 1 is evenly balanced. This results in prevention of the device from inclination, when the projection display device 1 is supported on a tripod, for example.

(8) Modified Embodiment

It is not intended to limit the present invention to the above-mentioned embodiment, and various other configurations including the following modifications may be made to accomplish the objects of the present invention.

Figure 13:
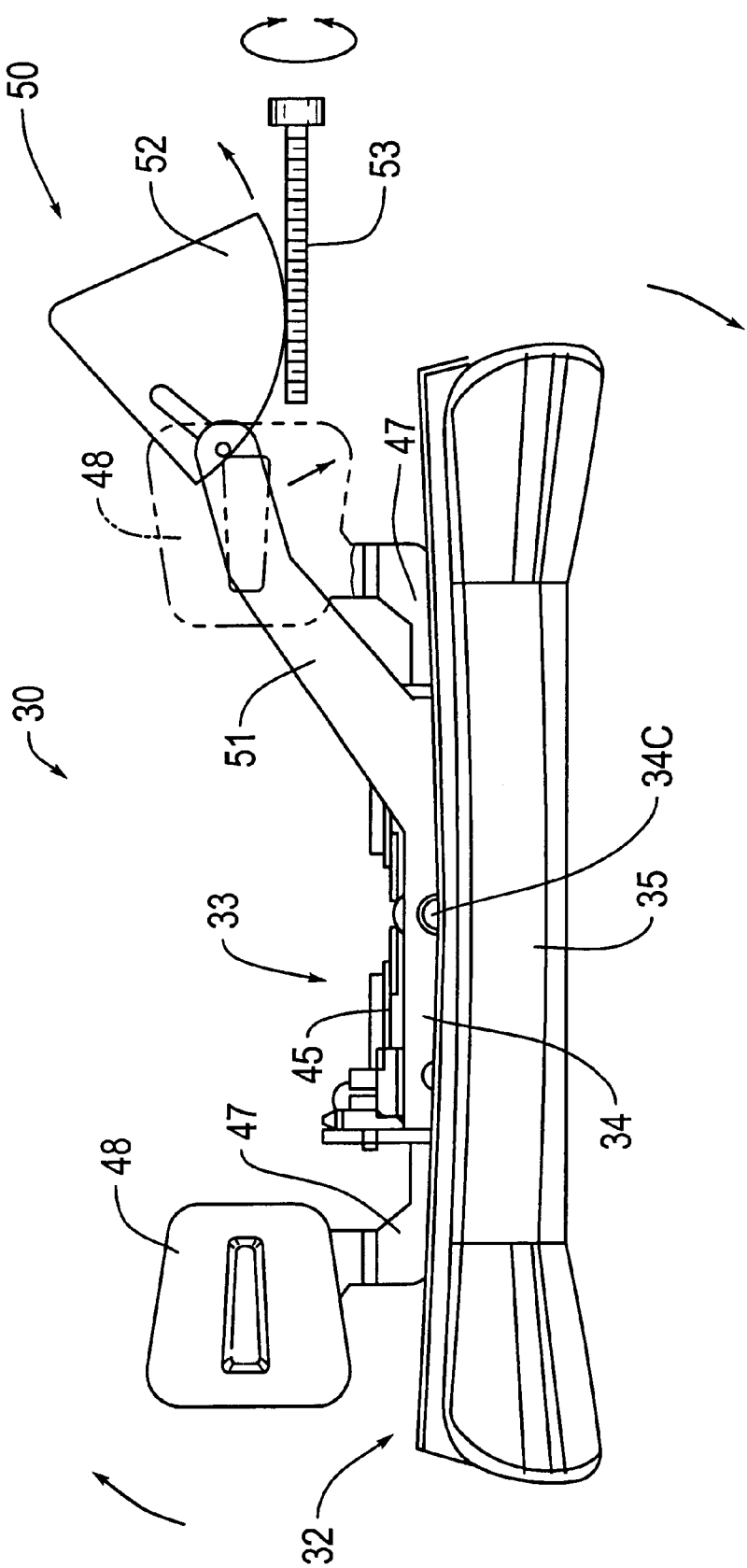
FIG. 13 is a front partially cutaway view showing a modified embodiment of the present invention.

For example, while in the above-mentioned embodiment, the first plate member 34 itself is elastically deformable to adjust the inclination angle of the projection angle adjusting mechanism 30, an inclination mechanism 50 for inclining the first plate member 34, as shown in FIG. 13, may be formed according to the present invention. Referring to FIG. 13, the inclination mechanism 50 may consist of an arm 51 fixed to the end surface of the first plate member 34, a worm wheel 52 rotatably engaged with the end portion of the arm 51 and also rotatably supported on the outer case (not shown), and a worm gear 53 in a screw relation with the worm wheel 52. By the rotation in the positive and reverse directions of the worm gear 53, the inclination of the first plate member 34 is adjusted about an engaging portion 34C through the worm wheel 52 and the arm 51. In addition, the inclination mechanism 50 is not limited to that shown in FIG. 13, and it may be, for example, one that uses a rack and pinion for inclination of the first plate member 34.

Further, according to the present invention, the first plate member 34 may be fixed to the lower case 4 such that the inclination angle of the projection angle adjusting mechanism 30 is not adjustable.

While in the above-mentioned embodiment, the fixing device 33 is formed such that the retention is achieved by the engagement of the retention member 37 having the grooves 37A with the sliding member 39 having the grooves 39A, it may be formed such that the retention is achieved by the friction force owing to a friction member such as a rubber formed in the opposing portion between the retaining portion 37 and the sliding portion 39 with each other. In addition, the pitch of the grooves 37A may be equal to that of the grooves 39A.

While in the above-mentioned embodiment the retaining by the retaining member 37 and the releasing of the retention can be performed by a plurality of knob portions 48 (operating portions), these operations may be possible by a single knob portion (operating portion).

While the power supply unit 7 may consist of the first and second power supply blocks 7A and 7B spaced from each other, the power supply unit 7 may be formed as a single unit without separating into a plurality of parts, according to the present invention.

As described above, according to the present invention, since a projection display device placed on a set-up surface for projecting images formed by an optical system on a projection screen and may consist of an outer case in which at least one surface thereof opposes the set-up surface, and a projection angle adjusting mechanism disposed in the outer case for adjusting a projection angle by changing the angle of the outer case with regard to the set-up surface, wherein the projection angle adjusting mechanism is independently mounted on a surface of the outer case opposing the set-up surface, a space for accommodating the projection angle adjusting mechanism within the device can be omitted. Therefore, reduction of space in the projection display device can be obtained, resulting in a device that may be a small size and thin.

What is claimed is:

1. A projection display device placed on a set-up surface that projects images formed by an optical system, the projection display device comprising:

an outer case having a plurality of surfaces, at least one of the surfaces opposing the set-up surface; and a projection angle adjusting mechanism disposed on said outer case that adjusts a projection angle by changing an angle of said outer case with regard to the set-up surface, said projection angle adjusting mechanism being independently mounted on a surface of said outer case opposing the set-up surface, and including a hinge member pivotable with respect to the surface of said outer case opposing the set-up surface, a fixing device that fixes the hinge member at a predetermined straddling angle thereof with respect to the surface of said outer case opposing the set-up surface, and a lever mechanism that retains and releases the fixing device.

2. The projection display device according to claim 1, said projection angle adjusting mechanism being detachably attached to the surface of said outer case opposing the set-up surface.

3. The projection display according to claim 1, the hinge member comprising a first plate member and a second plate member rotatably fixed to the first plate member, and the fixing device comprising a moving member which moves corresponding to an open-and-closing motion of the hinge member and a retaining member that retains the first plate member and the second plate member at a predetermined straddling angle thereof by fixing the moving member at a predetermined position.

4. The projection display device according to claim 3, the retaining member comprising a plurality of grooves, and the moving member comprising a plurality of grooves in contact with the grooves of the retaining member, a pitch of the grooves formed in one of the retaining member and the moving member being a plurality of times as large as that of another of the retaining member and the moving member.

5. The projection display device according to claim 1, said lever mechanism comprising a plurality of operating portions for the retention by the retaining member and for releasing the retention, the retention being performed by at least one of the operating portions.

6. A projection display device according to claim 1, said projection angle adjusting mechanism being formed such that an inclination angle is adjustable by rotation about an axis in a direction that projecting images are projected toward a projection screen.

7. A projection display device according to claim 6, said projection angle adjusting mechanism comprising an elastically deformable plate member having two ends, the plate member being axially supported at the two ends by said outer case such that a supporting shaft axis is in a direction that projecting images are projected toward the projection screen.

* * * * *